(12) United States Patent
Legault et al.

(10) Patent No.: US 12,531,870 B2
(45) Date of Patent: *Jan. 20, 2026

(54) SYSTEM AND METHOD FOR AGGREGATING CLIENT DATA AND CYBER DATA FOR AUTHENTICATION DETERMINATIONS

(71) Applicant: JPMorgan Chase Bank, N.A., New York, NY (US)

(72) Inventors: Jean-Francois Legault, Brooklyn, NY (US); D. J. Knoedler, Powell, OH (US); Neil Gorin, New York, NY (US); Kevin Liston, Columbus, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 127 days.

This patent is subject to a terminal disclaimer.

(21) Appl. No.: 18/510,008

(22) Filed: Nov. 15, 2023

(65) Prior Publication Data

US 2024/0089262 A1  Mar. 14, 2024

Related U.S. Application Data

(63) Continuation of application No. 17/326,898, filed on May 21, 2021, now Pat. No. 11,855,994, which is a
(Continued)

(51) Int. Cl.
*G06F 21/00* (2013.01)
*G06N 20/00* (2019.01)
(Continued)

(52) U.S. Cl.
CPC .......... *H04L 63/102* (2013.01); *G06N 20/00* (2019.01); *G06Q 20/401* (2013.01);
(Continued)

(58) Field of Classification Search
CPC ... H04L 63/102; H04L 63/08; H04L 63/0861; G06N 20/00; G06Q 20/401; G06Q 20/4016; G06Q 40/04; G06F 21/316
See application file for complete search history.

(56) References Cited

U.S. PATENT DOCUMENTS 8,214,446 B1  7/2012  Siegel et al.
9,166,999 B1  10/2015  Kulkarni et al.
(Continued)

FOREIGN PATENT DOCUMENTS

| CN | 101918963 | 12/2010 |
|---|---|---|
| CN | 104867012 | 8/2015 |
| EP | 3154013 | 4/2017 |

OTHER PUBLICATIONS

International Search Report (ISR) and Written Opinion (WO) from International Searching Authority in International Pat. Appl. No. PCT/US18/47211, dated Nov. 21, 2018, pp. 1-7.
(Continued)

*Primary Examiner* — Kendall Dolly
(74) *Attorney, Agent, or Firm* — Greenblum & Bernstein, P.L.C.

(57) ABSTRACT

A system that aggregates client data and cyber indicators to authenticate a client is provided. The system receives a request to access a financial account of the client, and retrieves a client profile. The client profile includes an aggregation of data into a plurality of data indicators. An optimal number of data indicators is determined based on an initial threshold inquiry regarding the request, with the optimal number of data indicators being determined based on a phone requesting the access to the financial account. A risk score is generated based on a weighting for each of the plurality of data indicators included within the optimal number, with the weighting representing a confidence in the
(Continued)

accuracy of each of those data indicators. Access to predetermined actions by the client is granted based on the risk score.

20 Claims, 3 Drawing Sheets

Related U.S. Application Data continuation of application No. 15/684,180, filed on Aug. 23, 2017, now Pat. No. 11,019,063.

(51) Int. Cl.
  *G06Q 20/40* (2012.01)
  *H04L 9/40* (2022.01)
(52) U.S. Cl.
  CPC ......... *G06Q 20/4016* (2013.01); *H04L 63/08* (2013.01); *H04L 63/0861* (2013.01)

(56) References Cited

U.S. PATENT DOCUMENTS

| | | | |
|---|---|---|---|
| 9,185,095 B1 | 11/2015 | Moritz et al. | |
| 9,721,296 B1 | 8/2017 | Chrapko | |
| 10,496,263 B2 | 12/2019 | So et al. | |
| 10,778,435 B1 | 9/2020 | Wimberley et al. | |
| 11,296,885 B2* | 4/2022 | Everson | H04L 9/3228 |
| 11,611,590 B1* | 3/2023 | Amar | G06Q 10/105 |
| 11,663,303 B2* | 5/2023 | Habal | G06F 21/316 726/25 |
| 12,130,908 B2* | 10/2024 | Ross | G06F 21/554 |
| 2005/0125339 A1 | 6/2005 | Tidwell et al. | |
| 2008/0066173 A1 | 3/2008 | Moran et al. | |
| 2009/0313165 A1 | 12/2009 | Walter | |
| 2011/0016049 A1 | 1/2011 | Kilfoil | |
| 2011/0055110 A1 | 3/2011 | Kolyvanov et al. | |
| 2014/0380484 A1 | 12/2014 | Choi et al. | |
| 2015/0242856 A1 | 8/2015 | Dhurandhar et al. | |
| 2015/0256550 A1 | 9/2015 | Taylor et al. | |
| 2016/0005029 A1 | 1/2016 | Ivey et al. | |
| 2016/0057248 A1 | 2/2016 | Tankha | |
| 2017/0085595 A1 | 3/2017 | Ng et al. | |
| 2017/0104741 A1 | 4/2017 | Sadr | |
| 2017/0237717 A1 | 8/2017 | Starosielsky et al. | |
| 2018/0248863 A1 | 8/2018 | Kao et al. | |
| 2022/0012352 A1* | 1/2022 | Boding | G06N 20/00 |
| 2024/0338439 A1* | 10/2024 | Golkar | G06F 21/554 |

OTHER PUBLICATIONS

Communication with the Extended European Search Report (EESR) from European Patent Office (EPO) in European Patent Appl. No. 18848855.5, dated Mar. 26, 2021, pp. 1-7.

Office Action issued by the China National Intellectual Property Administration (CNIPA) in Chinese Patent Application No. 201880068193.0, dated Mar. 16, 2013, together with an English language translation.

Intellectual Property Office of Singapore, Written Opinion and Invitation, Singapore Patent Application No. 11202001248Q, Jun. 28, 2021, pp. 1-7.

* cited by examiner

SYSTEM AND METHOD FOR AGGREGATING CLIENT DATA AND CYBER DATA FOR AUTHENTICATION DETERMINATIONS

CROSS-REFERENCE TO RELATED APPLICATIONS

This is a continuation of U.S. patent application Ser. No. 17/326,898, filed May 21, 2021, which is a continuation of U.S. patent application Ser. No. 15/684,180, filed Aug. 23, 2017 and now U.S. Pat. No. 11,019,063 issued May 25, 2021. The disclosure of each of the above-mentioned documents, including the specification, drawings, and claims, is incorporated herein by reference in its entirety.

FIELD OF THE INVENTION

The invention relates generally to a system and method for implementing authentication for retail and high net worth clients, and more particularly to a system and method that aggregates a combination of client data, device data, claims data and cyber fraud analysis to generate an authentication determination.

BACKGROUND OF THE INVENTION

Banks and other financial entities lose millions of dollars annually as a result of fraud schemes and other attacks. A significant portion of this is attributed to difficulties in identifying individual clients with respect to "authentication" decisions which precede account profile changes and execution of transactions. Due to the proliferation of data breaches involving personal data, e.g., PI and PII data, it is becoming easier for cyber criminals to impersonate consumers and pose as them when interacting with banks, companies, merchants and other entities. Personally identifiable information (PII) represents any data that identifies a specific individual as well as any information that may be used to distinguish one person from another.

Currently, banks and other financial entities do not leverage all available data elements tied to clients when making authentication decisions in the consumer, retail, and high net worth individual lines of business due to architecture, infrastructure, operational, and other challenges. As a result, banks commonly experience inaccurate authentication which leads to significant monetary and reputational impact for both the bank and its clients as cyber criminals are routinely impersonating clients and executing unauthorized account changes and subsequent payments.

These and other drawbacks currently exist.

SUMMARY OF THE INVENTION

According to one embodiment, the invention relates to a computer implemented system that aggregates client data, device data, claims data and cyber fraud analysis to generate an authentication determination. The system comprises: a memory that stores and maintains a plurality of client profiles; and a computer server comprising at least one computer processor and coupled to the memory, the computer server programmed to: receive, via an electronic input, an authorization request from a requester for access to an account; identify a client identifier associated with the authorization request; using the client identifier, retrieve, from the memory, a client profile, wherein the client profile is based on an aggregation of client data, client device data, claims data and cyber data; the client data comprises client account data, client behavior data and transaction activity data; the client device data comprises a device print associated with the authorization request; the claims data comprises pending and prior data relating to one or more reports of improper activity; and the cyber data comprises an indication of whether the client's personally identifiable information has been compromised; generate a risk score based on the aggregated combination of the client data, client device data, claims data and cyber data to determine whether the requester is authenticated to access the account; and automatically apply an authentication determination to the authorization request.

The system may include a specially programmed computer system comprising one or more computer processors, mobile devices, electronic storage devices, and networks.

The invention also relates to computer implemented method that aggregates client data, device data, claims data and cyber fraud analysis to generate an authentication determination. The method comprises the steps of: receiving, via an electronic input, an authorization request from a requester for access to an account; identifying, via a computer processor, a client identifier associated with the authorization request; using the client identifier, retrieving, from a memory component, a client profile, wherein the client profile is based on an aggregation of client data, client device data, claims data and cyber data; the client data comprises client account data, client behavior data and transaction activity data; the client device data comprises a device print associated with the authorization request; the claims data comprises pending and prior data relating to one or more reports of improper activity; and the cyber data comprises an indication of whether the client's personally identifiable information has been compromised; generating, via the computer processor, a risk score based on the aggregated combination of the client data, client device data, claims data and cyber data to determine whether the requester is authenticated to access the account; and automatically applying, via the computer processor, an authentication determination to the authorization request.

The computer implemented system, method and medium described herein provide unique advantages to financial institutions, banking clients and other entities, according to various embodiments of the invention. This authentication model will dramatically increase the accuracy of client identification and authentication decisions that financial institutions make prior to allowing for the execution of non-monetary and monetary transactions. It will contribute to a reduction of risk the bank and clients face—both from reputational and monetary perspectives. Other advantages include an improved client experience and reduced losses to the financial institution as well as banking client and customer loyalty and retention due to the improved satisfaction in improving accuracy of authentication decisions. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
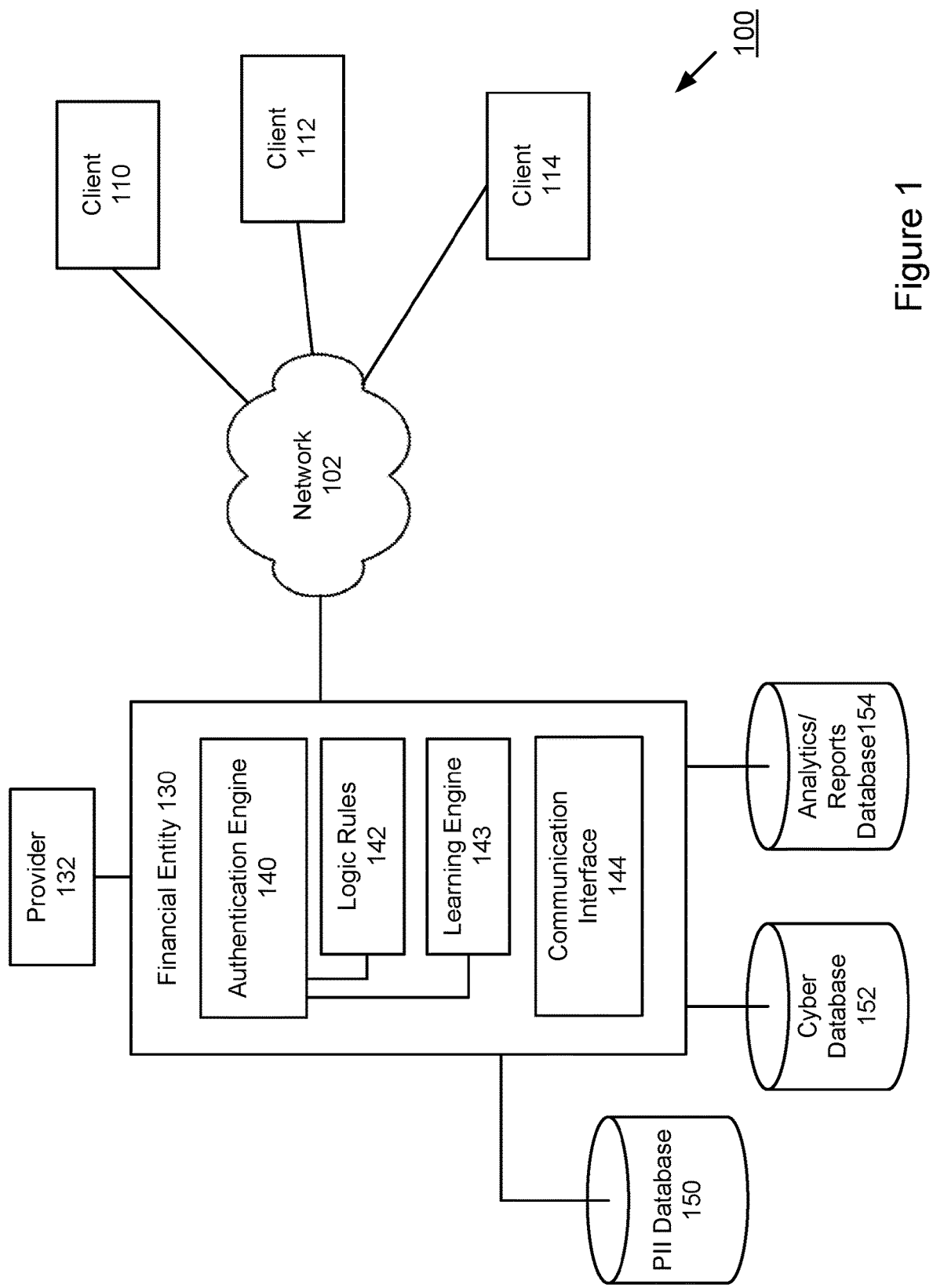
FIG. 1 illustrates a schematic diagram of a system that aggregates a combination of client data, device data, claims data and cyber fraud analysis to generate an authentication determination, according to an exemplary embodiment.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to an enhanced authentication system and method that aggregates, merges, and analyzes available data elements across client identity, transactions, behavior, and claims histories as well as cyber fraud data sets to generate a risk score for client authentication decisions across various entry points and payment channels for individual clients and customers. An embodiment of the present invention is directed to a risk-based approach that allows banks and other entities to make an informed and accurate authentication decision regarding the identity of clients.

An embodiment of the present invention may consider and weigh various data elements and/or factors to develop an authentication score to be used by lines of business (LOBs) and/or other teams when identifying clients. Based on a risk threshold and/or level of confidence, a line of business may allow a requesting entity to proceed with corresponding responses or actions. For example, based on a low risk score or analysis, a line of business may allow such attempts to authenticate to pass. Other attempts with a higher risk score may be referred for step-up (e.g., more stringent) authentication. And, more risky requests that fail authentication may be directed to a branch, a dedicated service center, or other option to provide for verification of identity with a higher level of confidence. An embodiment of the present invention may provide a tiered access approach. For example, if a client chooses to engage in what the bank views as riskier behavior post successful authentication (e.g., wire to first time beneficiary, etc.), the client may be re-routed for additional, more stringent authentication. According to another scenario, the client may be restricted to a limited number of available behaviors based on a risk score. Another option may involve a close monitor of the client (after authentication) where the available actions may be modified based on the client's behavior and/or developing cyber activity.

As financial industry intelligence sharing increases and becomes more sophisticated, an embodiment of the present invention is directed to pushing intelligence feeds directly into authentication decision engines to leverage information in a dynamic manner. An embodiment of the present invention may be directed to reducing dwell time between an identification of malicious activity tied to a data element shared across industry and an inclusion of such information in a risk based authentication decision at an entity, e.g., bank, financial institution, etc.

As technology and cross-industry relationships evolve, an embodiment of the present invention is directed to leveraging data elements unique to technology platforms and/or other industries tied to such platforms. For example, mobile network operators (including wireless carriers), mobile and computing device manufacturers, application developers and operating system providers as well as other entities associated with mobile communications (e.g., social media, etc.) and online banking may provide data elements useful in banking authentication decisions.

An embodiment of the present invention may support partnerships between entities with similar concerns and/or interests. Credit bureaus may provide access to binary data points such as indicators tied to recent address changes, identity theft, etc. An embodiment of the present invention may further leverage such data as there are significant benefits to information sharing of data tied to cyber-criminal behavior.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

FIG. 1 illustrates a schematic diagram of a system that aggregates a combination of client data, device data, claims data and cyber fraud analysis to generate an authentication determination, according to an exemplary embodiment. As illustrated, Network 102 may be communicatively coupled with various client or customer entities, represented by 110, 112 and 114. For example, Client may represent a customer or other entity that has a relationship with Financial Entity 130. Client may represent a company, a business or a high net worth individual. In addition, Network 102 communicates with Financial Entity 130 that provides various payment related services and/or other features.

Financial Entity 130 may include an Authentication Engine 140 that implements Logic Rules 142 to assess whether authentication requests are valid or not. Authentication Engine 140 may aggregate client data, device data, claims data and cyber fraud analysis to generate an authentication determination. According to an exemplary embodiment of the present invention, Authentication Engine 140 may generate a risk score for a authentication request. Authentication Engine 140 may receive data and inputs from various sources, including external sources (e.g., credit bureaus, third party entities, etc.). For example, external sources may include other financial institutions, clients, entities with corresponding or similar authentication data as well as cyber fraud data.

Authentication Engine 140 may also include Learning Engine 143. For example, an embodiment of the present invention may be directed to applying a learning algorithm to assess whether an authentication request for a particular client is valid. An embodiment of the present invention may apply machine learning and artificial intelligence algorithms to learn a client's behavior as well as keep up with fraudsters and their ever-changing tactics.

In addition, an embodiment of the present invention may apply machine learning to the authentication process to learn from false positives. For example, the system may generate a risk score (or other indication of risk) for a client. By analyzing the client's behavior and transaction history, the system may apply an over/under threshold that may be adjusted up or down. For example, although an authentication request may initially appear risky (e.g., a high risk score), the system may determine that the request is consistent with the client's past behavior or the behavior is expected based on a new data (e.g., a new job with additional responsibilities that may require transactions and requests, a sudden international trip that requires the client to be in a foreign country, etc.). Accordingly, the initial risk score may be adjusted up or down based on a client's action as well as developing cyber analysis. The over/under threshold may be continuously adjusted as new data is available. This approach may further address false positives and reduce improper denials of authentication requests.

PII Database 150 may store and maintain client data including client behavior data, client demographics, client device data, claims data, biometric data and/or other personally identification information. For example, PII Database 150 may also include IP address, geolocation, email activity and data, etc. PII Database 150 may receive data from various sources, internal and external.

Cyber Database 152 may store and maintain cyber data from clients, past fraud events, inferences made from black market activity, and/or other various sources of cyber related data. Cyber Database 152 may store data relating to fraud event, target (e.g., person/group/team targeted), amount (e.g., currency, threshold amounts, etc.), type of fraud request (e.g., wire transfer), type of target (e.g., communication channel, email, etc.) and/or other characteristic or factor. Cyber Database 152 may also identify known bad and known good fraud indicators, including bad/good beneficiaries, bad/good accounts, etc. Cyber Database 152 may receive data from various sources, internal and external.

Analytics/Reports Database 154 may store and maintain analytics, reports, trends and/or other data, etc. The authentication risk analysis and processing described herein may be provided by Financial Entity 130 and/or a third party provider, represented by 132, where Provider 132 may operate with Financial Entity 130, for example.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Network 102 may be a wireless network, a wired network or any combination of wireless network and wired network. For example, Network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102 may support an Internet network, a wireless communication network, a cellular network, Bluetooth, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although Network 102 is depicted as one network for simplicity, it should be appreciated that according to one or more embodiments, Network 102 may comprise a plurality of interconnected networks, such as, for example, a service provider network, the Internet, a cellular network, corporate networks, or even home networks, or any of the types of networks mentioned above.

Data may be transmitted and received via Network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Financial Entity 130 may communicate with various entities, via Communication Interface 144, using any mobile or computing device, such as a laptop computer, a personal digital assistant, a smartphone, a smartwatch, smart glasses, other wearables or other computing devices capable of sending or receiving network signals. Communication Interface 144 may represent a user interface and/or other interactive communication portal.

Financial Entity 130 may be communicatively coupled to Databases 150, 152, 154. Databases 150, 152, 154 may include any suitable data structure to maintain the information and allow access and retrieval of the information. For example, Databases 150, 152, 154 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Databases 150, 152, 154 may be any suitable storage device or devices. The storage may be local, remote, or a combination thereof with respect to Databases 150, 152, 154. Databases 150, 152, 154 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Databases 150, 152, 154 may have back-up capability built-in. Communications with Databases 150, 152, 154 may be over a network, or communications may involve a direct connection between Databases 150, 152, 154 and Financial Entity 130, as depicted in FIG. 1. Databases 150, 152, 154 may also represent cloud or other network based storage.

Figure 2:
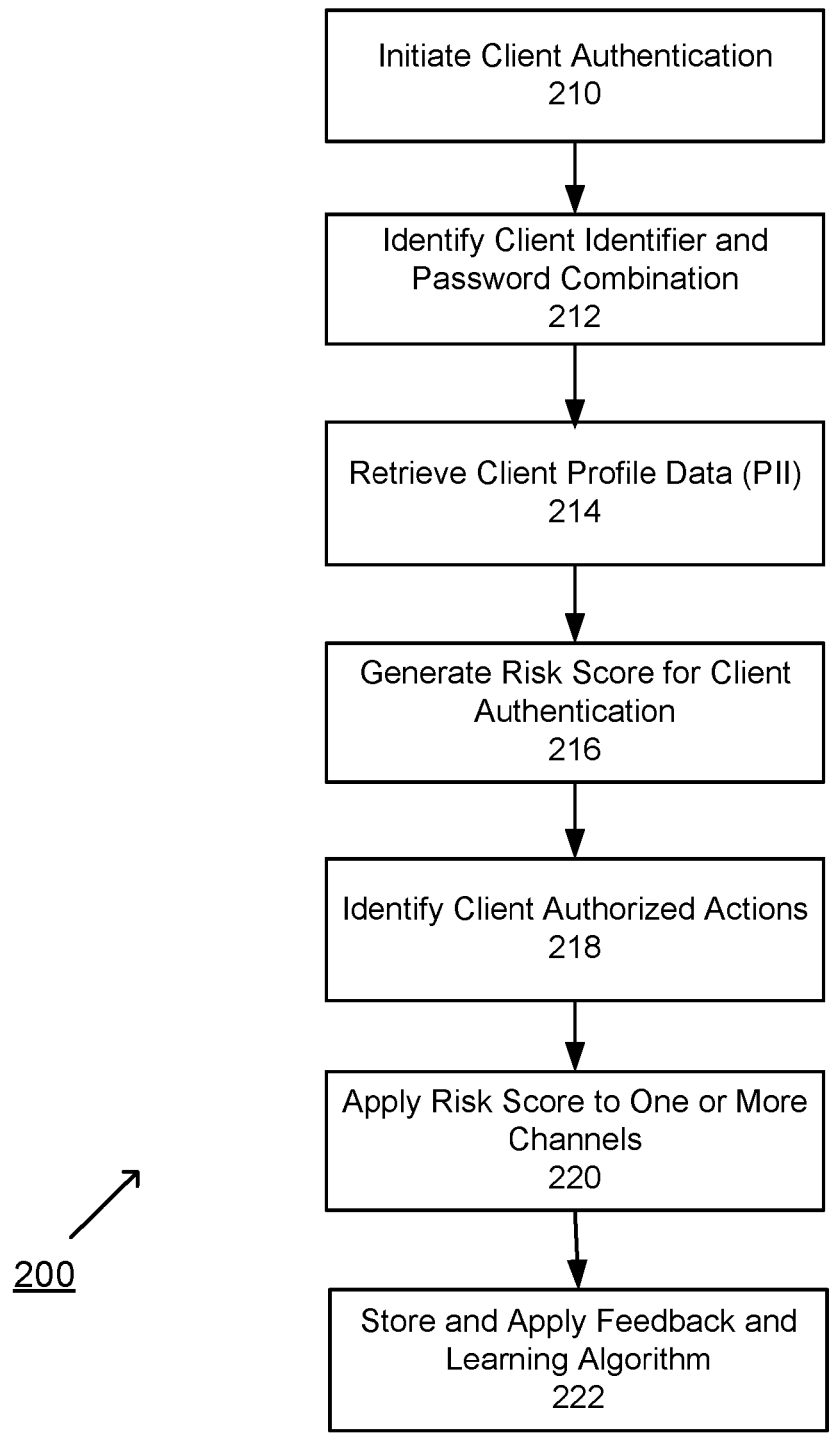
FIG. 2 is an exemplary flowchart that illustrates a method that aggregates client data, device data, claims data and cyber fraud analysis to generate an authentication determination, according to an embodiment of the present invention.

FIG. 2 is an exemplary flowchart that illustrates a method that aggregates client data, device data, claims data and cyber fraud analysis to generate an authentication determination, according to an embodiment of the present invention. At step 210, a client authentication process may be initiated. At step 212, client identifier and password combination may be identified. At step 214, client profile may be retrieved. At step 216, a risk score may be generated. At step 218, based on the risk score, one or more client authorized actions may be determined. At step 220, the risk score may be applied to one or more channels. At step 222, the system may store and apply feedback analysis for further refinement. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a client authentication process may be initiated. An embodiment of the present invention is directed to an improved authentication process that may be applied to payment requests or any request for access to data. The authentication process determines risk associated with authentication of a requesting entity's identity or credentials. For example, the innovative system may apply risk based decisioning to a requesting entity's attempt to access an account or application, perform account actions (e.g., transfer or wire funds, etc.), and/or other process that requires authentication or confirmation of identity via various modes of communication (e.g., online, mobile app, telephone, in-person, etc.). The risk based decisioning may be applied to various scenarios, including point of sale transactions, online and in-person merchants, access to confidential information, etc.

At step 212, client identifier and password combination may be identified. For example, a requesting entity may be required to input a client name and password combination. Other systems may require other forms of identification. This information may then be verified and used to access a client profile.

At step 214, client profile may be retrieved. The client profile may include a combination of client data, device data, credit/claims data as well as relevant cyber data. Additional details are provided in FIG. 3.

At step 216, a risk score may be generated. An embodiment of the present invention may apply the client profile data that includes various data elements to a risk engine to generate a risk score with an over/under threshold that may be monitored and maintained. For example, the system may recognize that a client has exceeded a risk score and thereby exceed the entity's risk tolerance in terms of authentication. Accordingly, an embodiment of the present invention is directed to protecting the entity (e.g., company, bank, financial institution, etc.) as well as customers and clients.

While the more data elements factored into a risk score, the more accurate the risk score, efficiencies may not allow for all available data to be considered. An embodiment of the present invention may determine an optimal number and quality of indicators to be applied in determining a risk score for a particular authentication request. An embodiment of the present invention may also determine how many indicators and/or what type of indicators are optimal to make a confident risk based decisions. The number and quality of indicators may be based on an initial threshold inquiry regarding the authentication request, entity requesting, geographic location, etc. According to another embodiment of the present invention, the decisioning may be applied to all authentication requests. In addition, the decisioning may be applied to authentication requests that meet a criteria, e.g., within a predetermined time period, a geographic location, type of request, etc. Other variations may be applied.

An embodiment of the present invention may leverage various types of cyber indicators in making an authentication decision. For example, an embodiment of the present invention may merge cyber fraud intelligence indicators, such as IP address that an authentication request is initiating from. The system may also observe whether the client is exhibiting a signature that is indicative of an infection of financial malware. For example, there may be an effort to mask or impersonate banking credentials. By combining various cyber intelligence indicators, an embodiment of the present invention may aggregate various cyber intelligence indictors to generate a risk score.

Moreover, based on certain considerations regarding confidence in the indicators, different weights may be applied in generating (e.g., updating, increasing, decreasing) the risk score. For example, the system may identify an emerging trend based on a particular type of fraud indicator. This may involve a particular attack on transactions destined for a foreign city. As a result, a higher weight may be applied to determinations involving that fraud indicator, e.g., transactions involving the foreign city. Also, the system may apply a higher risk level to transactions above a certain threshold amount. This may be captured by applying a higher weight to a higher transaction amount. Other variations may be applied.

At step 218, based on the risk score, one or more client authorized actions may be determined. The system may identify actions that are permitted based on the risk score. For example, if the risk is determined to be low, the transaction may proceed. If there is some risk involved, the system may allow the transaction to proceed with a monitoring feature on the funds.

At step 220, the risk score may be applied to one or more channels. An embodiment of the present invention is directed to aggregating data elements specific in the retail and high network individual client space. Based on the level of confidence that the requester is who they say they are, an embodiment of the present invention may permit actions commensurate with the level of confidence as well as consideration of other factors and data. For example, the system may allow a requester to perform some actions (based on an over/under score), such as check a balance, check on a transaction or view a limited transaction history but other actions may be prohibited, such as initiating a payment or an instant pay feature.

An embodiment of the present invention may apply a tiered response based on the authentication decisioning. For example, responses may include: authenticate with full functionality, authenticate with limited functionality and then no authentication. Other variations may be applied.

At step 222, the system may store and apply feedback analysis for further refinement. The system may continue to refine the process by examining and analyzing known fraud as well as known good transactions. The feedback analysis may also focus on client behavior information so that the system may better understand and predict a client's payment and transaction behavior. According to another example, a financial institution may recognize that a certain payment or other action may seem to diverge from a client's pattern of behavior.

Figure 3:
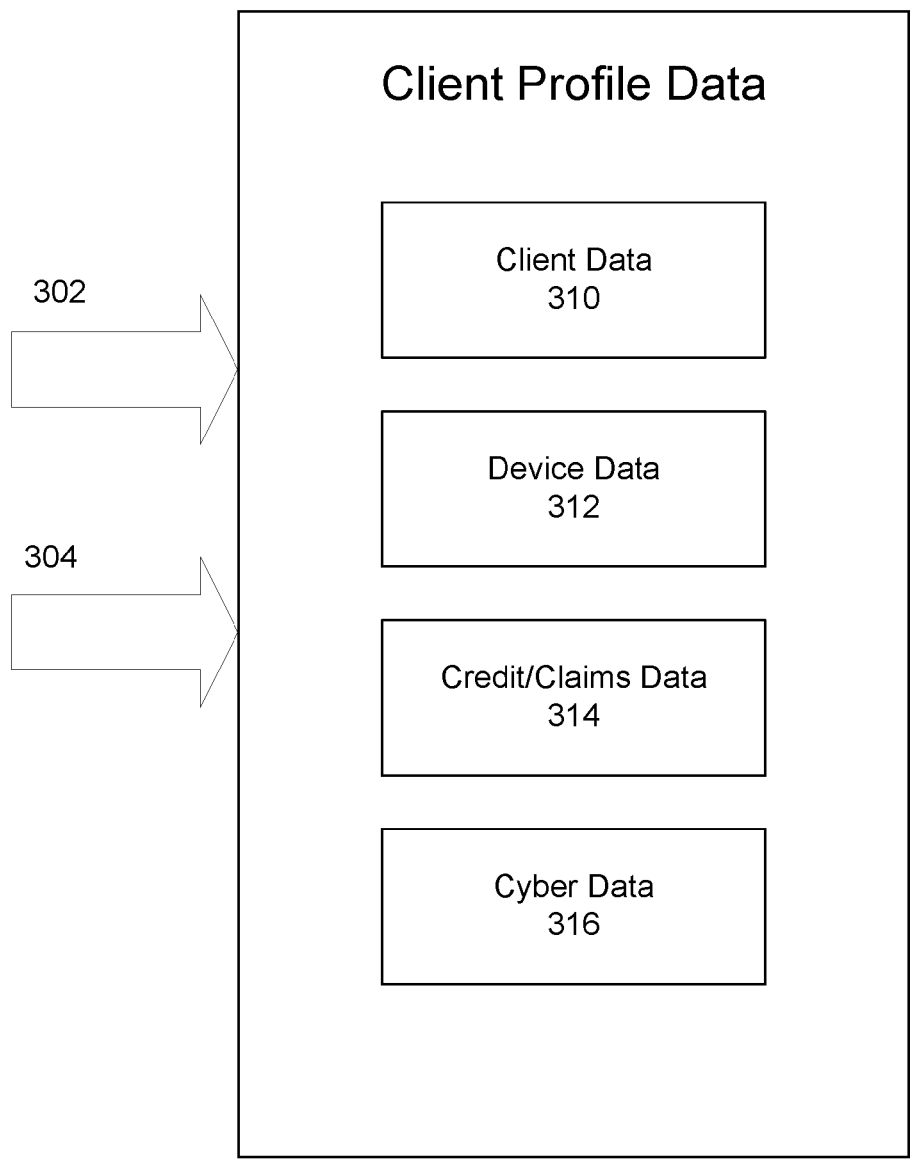
FIG. 3 is an illustration of various types of data that may be used for authentication decisioning, according to an embodiment of the present invention.

FIG. 3 is an illustration of various types of data that may be used for authentication decisioning, according to an embodiment of the present invention. As shown in FIG. 3, an embodiment of the present invention may aggregate Client data 310, Device Data 312 and Credit/Claims Data 314 and Cyber Data 316. The data may be received from various sources, represented by Input 302 (from internal sources) and Input 304 (from external sources). Internal sources may represent various lines of business within a company, affiliates, subsidiaries, contractors, partners, etc. External sources may include credit bureaus, government entities, third party providers, competitors in the same or relevant field, social media services, cyber organizations, etc.

Client Data 310 may include account data, client demographic data, client behavior data as well as other related information. Client data may include name, address, mobile telephone number, date of birth, social security number, household data etc. An embodiment of the present invention may analyze characteristics of an authentication request itself, such as what kind of authentication (e.g., access to funds, access to information, etc.), time of authentication (e.g., 2:00 am EST) and then compare to the client's "normal" or baseline authentication behavior. The system may apply a specific baseline for each client or apply a baseline to a group, class or type of client. According to an embodiment of the present invention, the system may apply machine learning to identify a client's expected behavior and then establish a range so that when an action is outside of the expected behavior and range, the system may be alerted and further update or adjust the client's risk score. For example, if the client's behavior is outside what is expected, the risk score may be raised by a certain amount.

The system may consider other types of information, including a tenure of client. The system may also consider whether there is a co-signer or authorized user associated with client, profile and/or account. If yes, the system may determine whether the party is associated with any negative behavior. The system may also consider whether the client has security features, such as two-factor authentication enabled. Many companies apply a second factor authentication that involves sending an outbound message or text message to a mobile phone to verify a client's identity. As a result, fraudsters are now compromising client mobile telephone accounts in addition to their identities to counter second factor authentication.

Client behavior may include velocity and/or frequency of authentication activity; a date/time pattern of historical authentication activity (e.g., geographic location of prior authentication activity, etc.); age of last non-monetary change to online banking profile; device contact information address change, and other activities.

Client data may also include other types of authentication data, including IP authentication attempts, where the attempts are originating from and whether the originating data matches historical attempts. The system may also consider country risk score; whether the IP address is associated with negative activity (or is on a negative list) and whether it is associated with known proxy traffic. Other data may consider whether client activity corresponds to prior activity, e.g., whether the day of week/time of day aligns with prior activity.

Client data may consider client presence in a location, such as a branch location, and age of activity as well as type of activity.

An embodiment of the present invention may apply data points collected as part of a client on boarding process. For example, a financial institution may have an onboarding procedure to ascertain the client's background and expected behavior. Such information may include financial activity, such as how many wires would they send in a year; projected average daily balance (or range), etc. This information helps an entity determine what is likely in-band behavior versus out of band. In other words, clients may shift from normal or close to normal behavior to out of character behavior.

For example, the system may recognize a client as having a checking account. The client may also have an on-line profile that enables the client to login to an associated website with a username and password combination. The system may retrieve client information at the point of login as well as IP address to identify a geographic area and determine whether these elements fit the client's behavior and/or profile in real-time. An embodiment of the present invention may aggregate authentication data, such as client name, address, date of birth and compromised or potentially compromised information. This information may include data relating to information that is sold (or suspected of sale) in the criminal underground or available in the criminal underground.

Device Data 312 may represent a device print associated with a login attempt. An embodiment of the present invention may also identify client devices and also determine malware indicators that could signal a potential breach or attack. For example, the system may consider device identifier, device type (e.g., mobile phone, smart phone, personal assistant device, smart home device, etc.), device signature and/or other client device data. The system may obtain a particular device signature associated with a requesting entity. For example, a type of phone running on a specific operating system may have a certain attribute that may be associated with a client and pending claims even though these claims may not be dispositive of fraud or breach. The system may recognize device activity and associate the device activity with a client profile. This activity may increase (or decrease) a current risk score for the client.

An embodiment of the present invention may also consider geographic information that may be obtained by a mobile application. This may refer to physical location (e.g., city, state, region, etc.). The system may also consider Internet geography that identifies a client's digital footprint.

For example, the system may expect a client's mobile phone to communicate via a known wireless carrier. The system, however, may flag an interaction if the communication is coming from a digital ocean, a cloud provider, VPN space, etc.

The system may determine whether authentication attempts match historical attempts; whether the attempt is linked to other clients; whether the device is associated with negative behavior or is on a negative list; whether the attempt contains high risk language attributes, age of expected configuration (e.g., operating system, software, software updates, releases, etc.).

Device data may also include Automatic number identification (ANI) associated with authentication attempt. For example, the system may determine whether the detected ANI matches historical activity; whether the ANI matches the ANI on the client profile; whether the ANI is linked to activity of other clients and whether it's on a negative list. ANI may represent a feature of a telecommunications network for automatically determining an origination telephone number. For example, ANI may represent a reference to a phone numbers from which a payment instruction is made as well as a modification to an existing instruction.

The system may also determine whether the client's geolocation captured via a mobile application matches where they claim to be when asked; whether the location is within a specified distance to their address on their profile; and whether the geographic login information fits a past pattern of behavior.

The system may determine a confidence rank of a client email provider on record. For example, the system may recognize that a particular electronic mail provider is heavily favored by cyber criminals. Also, the system may consider whether the client has push notifications enabled. Prior to implementing a device or other non-monetary change on a customer's profile, a push notification may be sent to allow for approval/denial of proposed changes or actions. The push notification may be separate from a Short Message Service (SMS) through a mobile app. By monitoring push notifications, the system may obtain confirmation of changes that criminals routinely execute to support their fraud schemes. If a customer being targeted by a criminal is notified a request has been made to update their phone number, address, mobile device, this provides an opportunity to deny the change whereas an SMS message can be intercepted. The system may also determine whether the client presents a signature associated with financial malware. Other actions may be identified.

An embodiment of the present invention is directed to implementing biometrics in the authentication analysis. This may involve implementing and leveraging additional technology when building a risk based authentication score. An embodiment of the present invention may consider biometric authentication that may provide additional weights. In many instances, biometric identifiers may be given additional weights because of their reliability. The system may identify new fraud initiatives and learn from a known fraud attempt. In an example where fraudsters start spoofing biometrics, upon recognizing a fraudulent biometric (or other new type of fraud), the system may identify the known fraud and apply machine learning to flag or identify this type of fraud as a new type of threat. The system may then identify similarities in other accounts (based on the biometric fraud) and further identify accounts that may be at risk based on similarities with the known fraud.

The system may consider a voice biometric confidence score. The system may also take into account a general velocity of activity. The velocity may also be determined for a period of time or based on types of interactions, etc.

An embodiment of the present invention may merge authentication data with data from mobile network operators, mobile phone carrier space and electronic mail space. The information may be aggregated but not visible to each other. For example, the system may notice changes made on a client's webmail account, soon after changes in the mobile carrier are detected and then ultimately this client makes modifications to on-line banking accounts. This chain of modifications may serve as a strong indication that an attacker has retrieved enough information to take over those channels.

Additional details are provided in co-pending patent application U.S. Ser. No. 15/393,836, filed Dec. 29, 2016, and U.S. Ser. No. 15/397,368, filed Jan. 3, 2017, the contents of which are incorporated by reference herein in their entirety.

Credit/Claims Data 314 may include previous and active fraud claims (e.g., age of claim, disposition of claims, etc.) as well as credit tier, credit score, number of open lines of credit, etc. Claims data may include data relating to clients making a claim about an unauthorized charge or other activity on an account, e.g., credit card, checking account, etc. The system may also determine whether the client has a fraud alert on file with a credit bureau and whether the client is associated with any credit monitoring-recent account openings.

Cyber Data 316 may include data relating to previous exposure of login credentials in a data breach. Cyber data may also include whether the client's PII data has been available for sale in the underground economy as well as what elements are involved and a time period of exposure or risk.

An embodiment of the present invention may access and apply analysis that indicates that a client's personal information has been compromised. This information may be a result of a recent data breach with the entity, as well as other entities (e.g., wireless carrier, email provider, retirement accounts, credit card, debit card, identity theft, etc.). This analysis may be aggregated to build or update a profile for consumers.

The system may determine whether the client has login credentials for third party websites that have been compromised, such sites may include social media; other financial entities; webmail, etc. For example, the system may recognize that a client's telephone account was compromised during a cyber breach against the client's wireless carrier. As a result, the client's telephone account may be compromised by an attacker selling or using the client's identity in the black market. This information may then be used to determine or adjust a risk associated with this client.

An embodiment of the present invention may also monitor fraud rates associated with current clients. In other words, an entity may be aware of a hundred clients whose information has been stolen and now available in an underground economy. This may result in an increase in the fraud rate associated with those clients. The system may then pay closer attention and start taking action or remedial action as the fraud rate rises. In other words, before the fraud reaches a critical level, an embodiment of the present invention may apply the known breach and recovery efforts and further apply the information in a risk based authentication decision. This may involve making a technology based decision on whether the person trying to log into an online banking application to access a checking account is authorized. An embodiment of the present invention may apply elements, such as IP addresses associated with fraud or attempted fraud of other financial institutions. The elements may be shared across industry players and competitors. Elements may also include email addresses, such as client personal webmail addresses, etc. An embodiment of the present invention may recognize that the email address is compromised because this information was recovered from a prior breach. The system may recognize other data that has been compromised or subject to fraud or attack.

An embodiment of the present invention aggregates authentication data and PII information. The system may proactively retrieve and access stolen personal data as well as personally identifiable information (PII) from the black market. The system may recover stolen information and then use the information for various fraud identification processes.

An embodiment of the present invention may access information through the black market and further determine that certain accounts and/or personal information were compromised or had a high risk of compromise. An embodiment of the present invention may maintain and manage a central data repository where various intelligence feeds for different types of information are received into one repository. That information may then be pushed to an appropriate line of business stakeholders to leverage the information in an automated fashion.

The system may consider whether the client is operating from a device that has or has not been jailbroken, rooted, etc. Other data may relate to whether the client associated with an aggregation services, etc. The system may also consider recent activity at a merchant or service providers where PI/PII was likely to have been harvested for fraud purposes including recent USPS address change and recent mobile carrier non-monetary change.

An embodiment of the present invention is directed to aggregating information from entities across an industry as well as other industries. More specifically, an embodiment of the present invention may recognize discernable patterns in an industry and across industries and apply valuable set of data in a risk based authentication decision.

An embodiment of the present invention is directed to leveraging information across lines of business even in an industry lines of business are completely different and largely detached. For example, an embodiment of the present invention may recognize a retail client who has a relationship with an entity as an individual product consumer but the client is also an employee of a merchant who is a corporate investment bank client. The system may further recognize that the client is a user with authority to move money on behalf of merchant. Accordingly, an embodiment of the present invention is directed to taking some of the things performed to protect a client in the retail space to authenticate him accurately and further leveraging that because the system recognizes that they are a user on behalf of the merchant in the wholesale space. In other words, if a fraudster is targeting them, trying to impersonate them and attempt to move money for that matter on the retail side, the system recognizes that fraudster are likely also targeting them to transfer funds on behalf of the merchant.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIG. 1 includes a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript, etc. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the client's mobile device, other embodiments of the invention can be implemented using similar technologies, such as transmission of data that is displayed using an existing web browser on the client's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that aggregates client data and cyber indicators to authenticate a client, the system comprising:
   a memory that stores and maintains a plurality of client profiles; and
   a computer server comprising at least one computer processor and coupled to the memory, the computer server programmed to:
      receive, via an electronic input from a phone, a request to access a financial account of the client, the request comprising a client identifier and a password;
      retrieve a client profile, from the memory, based on the client identifier and the password, the client profile including an aggregation of data into a plurality of data indicators;
      determine, based on an initial threshold inquiry regarding the request, an optimal number of the plurality of data indicators, the optimal number of the plurality of data indicators being determined based on the phone requesting the access to the financial account;
      generate a risk score based on a weighting for each of the plurality of data indicators included within the optimal number, the weighting representing a confidence in the accuracy of each of those data indicators;
      grant access to predetermined actions by the client based on the risk score; and
      apply machine learning to the risk score generation,
   wherein the machine learning analyzes behavior of a requestor and a transaction history to determine whether the behavior is outside of an expected behavior range and updates the risk score based on a determination result, and applies feedback to reduce improper denials of authorization requests.

2. The system of claim 1, wherein at least one of the optimal number of the plurality of data indicators includes a type of the phone.

3. The system of claim 2, wherein a further one of the optimal number of the plurality of data indicators includes an operating system of the phone.

4. The system of claim 3, wherein an even further one of the optimal number of the plurality of data indicators includes an age of the operating system of the phone.

5. The system of claim 3, wherein an even further one of the optimal number of the plurality of data indicators includes a configuration of updates of the operating system of the phone.

6. The system of claim 1, wherein the computer server is further programmed to:
   recognize device activity of the phone, associate the device activity with the client profile, and one of increase or decrease the risk score based on the device activity of the phone.

7. The system of claim 1, wherein
   the computer server is further programmed to:
      obtain geographic information of the phone; and
      determine that the geographic information of the phone is from a predetermined geographic location, and
   the initial threshold inquiry is satisfied in response to the computer server determining that the geographic information of the phone is from the predetermined geographic location, whereby the computer server determines the optimal number of the plurality of data indicators.

8. The system of claim 1, wherein
   the computer server is further programmed to:
      determine that the request to access the financial account of the client is within a predetermined time period, and
   the initial threshold inquiry is satisfied in response to the computer server determining that the request to access the financial account of the client is within the predetermined time period, whereby the computer server determines the optimal number of the plurality of data indicators.

9. The system of claim 1, wherein
   the computer server is further programmed to:

determine that the request to access the financial account of the client is of a predetermined type of request, and the initial threshold inquiry is satisfied in response to the computer server determining that the request to access the financial account of the client is of the predetermined type of request, whereby the computer server determines the optimal number of the plurality of data indicators.

10. The system of claim 1, wherein the initial threshold inquiry is satisfied for all requests to access the financial account of the client.

11. The system of claim 1, wherein the request to access the financial account of the client is permitted in response to the risk score being below a predetermined threshold.

12. The system of claim 11, wherein the request to access the financial account of the client is permitted to proceed with a monitoring feature in response to the risk score being above the predetermined threshold.

13. The system of claim 1, wherein the computer server grants the access to the predetermined actions by the client in a tiered access approach based on the risk score.

14. The system of claim 1, wherein the computer server is further programmed to:

apply a specific baseline for the client in order to grant the access to the predetermined actions by the client based on the risk score.

15. The system of claim 1, wherein the computer server is further programmed to:

determine the optimal number of the plurality of data indicators further based on a type of the request to access the financial account of the client.

16. The system of claim 1, wherein the computer server is further programmed to:

obtain a physical location of the phone, and at least one of the optimal number of the plurality of data indicators includes the physical location of the phone.

17. The system of claim 1, wherein the computer server is further programmed to:

obtain a wireless carrier of the phone, and at least one of the optimal number of the plurality of data indicators includes the wireless carrier of the phone.

18. The system of claim 1, wherein the computer server is further programmed to:

automatically adjust the risk score based on subsequent customer data and cyber data.

19. A method that aggregates client data and cyber indicators to authenticate a client, the method comprising:

receiving, via an electronic input from a phone, a request to access a financial account of the client, the request comprising a client identifier and a password;

retrieving a client profile based on the client identifier and the password, the client profile including an aggregation of data into a plurality of data indicators;

determining, based on an initial threshold inquiry regarding the request, an optimal number of the plurality of data indicators, the optimal number of the plurality of data indicators being determined based on the phone requesting the access to the financial account;

generating a risk score based on a weighting for each of the plurality of data indicators included within the optimal number, the weighting representing a confidence in the accuracy of each of those data indicators;

granting access to predetermined actions by the client based on the risk score; and applying machine learning to the risk score generation, wherein the machine learning analyzes behavior of a requestor and a transaction history to determine whether the behavior is outside of an expected behavior range and updates the risk score based on a determination result, and applies feedback to reduce improper denials of authorization requests.

20. A non-transitory computer-readable medium including a program that, when executed by a computer processor, causes the computer processor to perform operations, the operations comprising:

receiving, via an electronic input from a phone, a request to access a financial account of the client, the request comprising a client identifier and a password;

retrieving a client profile based on the client identifier and the password, the client profile including an aggregation of data into a plurality of data indicators;

determining, based on an initial threshold inquiry regarding the request, an optimal number of the plurality of data indicators, the optimal number of the plurality of data indicators being determined based on the phone requesting the access to the financial account;

generating a risk score based on a weighting for each of the plurality of data indicators included within the optimal number, the weighting representing a confidence in the accuracy of each of those data indicators;

granting access to predetermined actions by the client based on the risk score; and applying machine learning to the risk score generation, wherein the machine learning analyzes behavior of a requestor and a transaction history to determine whether the behavior is outside of an expected behavior range and updates the risk score based on a determination result, and applies feedback to reduce improper denials of authorization requests.

* * * * *